United States Patent
Abraham et al.

(10) Patent No.: US 9,313,641 B2
(45) Date of Patent: Apr. 12, 2016

(54) SYSTEM AND METHOD FOR ADVERTISING AND COMMUNICATING WITHIN A NEIGHBORHOOD AWARE NETWORK

(71) Applicant: QUALCOMM Incorporated, San Diego, CA (US)

(72) Inventors: Santosh Paul Abraham, San Diego, CA (US); George Cherian, San Diego, CA (US); Rolf De Vegt, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 14/028,204

(22) Filed: Sep. 16, 2013

(65) Prior Publication Data
US 2014/0080481 A1 Mar. 20, 2014

Related U.S. Application Data

(60) Provisional application No. 61/701,899, filed on Sep. 17, 2012.

(51) Int. Cl.
*H04B 7/212* (2006.01)
*H04W 8/00* (2009.01)

(52) U.S. Cl.
CPC ............ *H04W 8/005* (2013.01); *Y02B 60/50* (2013.01)

(58) Field of Classification Search
CPC ..... H04W 4/001; H04W 4/021; H04W 4/025; H04W 4/06; H04W 4/20; H04W 4/206; H04W 84/18; H04W 8/005; H04W 52/0216; H04W 56/001; H04W 72/04; Y02B 60/50; H04L 43/0811; H04L 41/085; H04L 45/46; H04L 69/24

USPC ............ 455/434, 435.1, 435.2, 450; 370/312, 370/329, 330, 338, 345–350, 434; 709/221, 709/225, 226, 228, 229
See application file for complete search history.

(56) References Cited

U.S. PATENT DOCUMENTS

| | | | | |
|---|---|---|---|---|
| 6,564,261 | B1 * | 5/2003 | Gudjonsson | ........ H04L 12/1818 370/261 |
| 7,860,019 | B2 | 12/2010 | Zhang et al. | |
| 2003/0063608 | A1 | 4/2003 | Moonen | |
| 2004/0208152 | A1 * | 10/2004 | Perkins | ................. H04W 48/16 370/338 |

(Continued)

OTHER PUBLICATIONS

Lee C., et al., "Konark: A System and Protocols for Device Independent, Peer-to-Peer Discovery and Delivery of Mobile Services," IEEE Transactions on Systems, Man, and Cybernetics—Part A: Systems and Humans, vol. 33 (6), Nov. 2003, pp. 682-696.

(Continued)

*Primary Examiner* — Allahyar Kasraian
(74) *Attorney, Agent, or Firm* — Knobbe Martens Olson & Bear LLP

(57) ABSTRACT

In a particular embodiment, a method includes receiving, by a first mobile device, a first discovery message via a network advertisement protocol common to a plurality of mobile devices. The first discovery message includes information specific to a mobile device cluster that is a subset of the plurality of mobile devices. The method further includes using the information to communicate with at least a second mobile device of the mobile device cluster using a second cluster protocol that is different than the network advertisement protocol.

56 Claims, 7 Drawing Sheets

(56) References Cited

U.S. PATENT DOCUMENTS

| | | | | |
|---|---|---|---|---|
| 2007/0014267 | A1* | 1/2007 | Lam | H04W 48/10 370/338 |
| 2007/0019616 | A1* | 1/2007 | Rantapuska | H04L 12/1822 370/352 |
| 2007/0112963 | A1* | 5/2007 | Dykes | H04L 45/02 709/227 |
| 2009/0034432 | A1* | 2/2009 | Bonta | H04W 74/02 370/255 |
| 2009/0285140 | A1* | 11/2009 | Kim | H04L 12/12 370/311 |
| 2009/0319663 | A1 | 12/2009 | Giles et al. | |
| 2010/0074133 | A1* | 3/2010 | Kim | G01S 5/0289 370/252 |
| 2010/0111006 | A1* | 5/2010 | Zhai | H04W 99/00 370/329 |
| 2011/0032912 | A1* | 2/2011 | Cordeiro | H04W 48/10 370/336 |
| 2011/0153773 | A1 | 6/2011 | Vandwalle et al. | |
| 2012/0131153 | A1 | 5/2012 | Schmidt et al. | |
| 2012/0231825 | A1* | 9/2012 | Gossain | H04W 72/02 455/509 |
| 2015/0245305 | A1* | 8/2015 | Camps Mur | H04W 56/00 370/350 |

OTHER PUBLICATIONS

Lee C., et al., "Protocols for Service Discovery in Dynamic and Mobile Networks," International Journal of Computer Research, 2002, vol. 11 (1), pp. 1-12.

International Search Report and Written Opinion—PCT/US2013/060190—ISA/EPO—Nov. 25, 2013.

* cited by examiner

SYSTEM AND METHOD FOR ADVERTISING AND COMMUNICATING WITHIN A NEIGHBORHOOD AWARE NETWORK

I. CROSS-REFERENCE TO RELATED APPLICATIONS

The present application claims priority to provisional U.S. Application Ser. No. 61/701,899, entitled "System and Method for Advertising and Communicating within a Neighborhood Aware Network," filed Sep. 17, 2012, assigned to the assignee hereof and incorporated herein by reference in its entirety.

II. FIELD

The present disclosure is generally related to neighborhood aware networks (NANs).

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

As wireless devices become less expensive and more common, networks can experience increased traffic, potentially burdening the networks, slowing performance of the wireless devices, and frustrating users. Accordingly, network setup and network resource allocation (e.g., how traffic is routed within the network) are important considerations in designing and implementing wireless devices and wireless networks.

IV. SUMMARY

In at least one embodiment, techniques enable secure and power-efficient proximity-based services (e.g., via a neighborhood-aware network (NAN)). For example, in at least one embodiment, a "general" protocol (e.g., "first tier") protocol is used to facilitate discovery of a mobile device cluster and a cluster-specific (e.g., "second tier") protocol is used for communication within the mobile device cluster (e.g., for discovery of particular devices within the mobile device cluster). Each mobile device cluster may be associated with a particular mobile device application within the NAN. The techniques may reduce burdens on "centralized" communication devices, such as access points (APs) and base stations, by enabling "direct" communication between mobile devices.

In a particular embodiment, a method includes receiving, by a first mobile device, a first discovery message via a network advertisement protocol common to a plurality of mobile devices. The first discovery message includes information specific to a mobile device cluster that is a subset of the plurality of mobile devices. The method further includes using the information to communicate with at least a second mobile device of the mobile device cluster using a second cluster protocol that is different than the network advertisement protocol.

In another particular embodiment, a mobile device includes a processor and a memory coupled to the processor. The memory stores instructions executable by the processor to receive a first discovery message via a network advertisement protocol common to a plurality of mobile devices. The first discovery message includes information specific to a mobile device cluster that is a subset of the plurality of mobile devices. The instructions are further executable by the processor to use the information to communicate with at least a second mobile device of the mobile device cluster using a second cluster protocol that is different than the network advertisement protocol.

In another particular embodiment, a method includes sending, by a first mobile device, a first discovery message via a network advertisement protocol common to a plurality of mobile devices. The first discovery message includes information specific to a mobile device cluster that is a subset of plurality of mobile devices. The method further includes receiving a message from a second mobile device sent based on the information specific to the mobile device cluster using a second cluster protocol that is different than the network advertisement protocol.

In another particular embodiment, a mobile device includes a processor and a memory coupled to the processor. The memory stores instructions executable by the processor to send a first discovery message via a network advertisement protocol common to a plurality of mobile devices. The first discovery message includes information specific to a mobile device cluster that is a subset of the plurality of mobile devices. The instructions are further executable by the processor to receive a message from a second mobile device sent based on the information specific to the mobile device cluster using a second cluster protocol that is different than the network advertisement protocol.

One particular advantage provided by at least one of the disclosed embodiments is improved allocation of network resources. For example, enabling "direct" communication between mobile devices may reduce burdens on "centralized" communication devices, such as access points (APs) and base stations.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
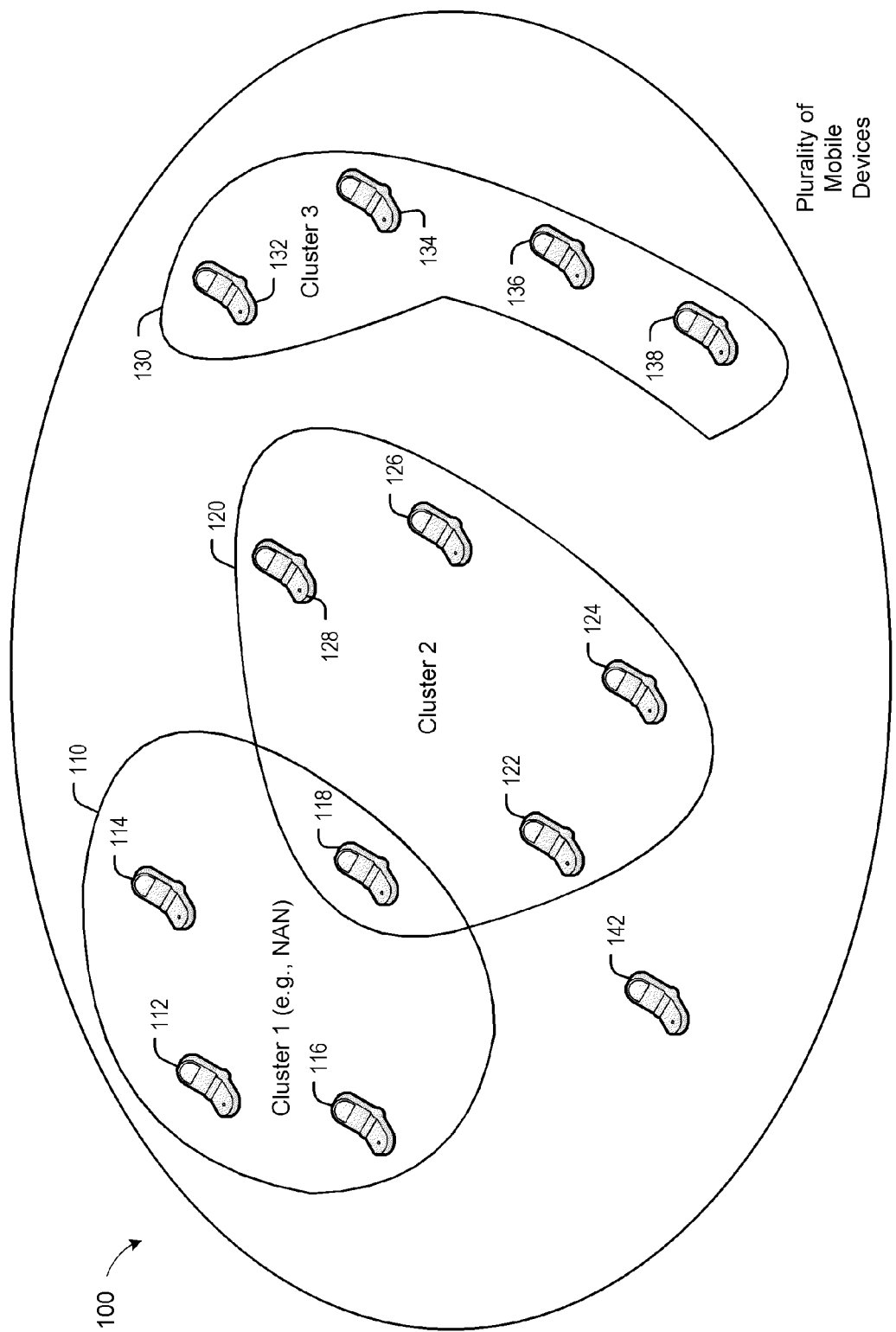
FIG. 1 is a diagram of a particular illustrative embodiment of a plurality of mobile devices and mobile device clusters of the plurality of mobile devices.

Referring to FIG. 1, a particular illustrative embodiment of a plurality of mobile devices is depicted and generally designated 100. The plurality of mobile devices 100 includes a first mobile device cluster 110, a second mobile device cluster 120, a third mobile device cluster 130, and a mobile device 142.

The first mobile device cluster 110 includes a mobile device 112, a mobile device 114, a mobile device 116, and a mobile device 118. The second mobile device cluster 120 includes the mobile device 118, a mobile device 122, a mobile device 124, a mobile device 126, and a mobile device 128. The third mobile device cluster 130 includes a mobile device 132, a mobile device 134, a mobile device 136, and a mobile device 138. In the particular example of FIG. 1, the mobile device 142 has not joined (e.g., is not a member of) any of the mobile device clusters 110, 120, 130. Further, in the particular example of FIG. 1, the mobile device 118 has joined (e.g., is a member of) multiple mobile device clusters (i.e., the mobile device clusters 110, 120).

According to various embodiments, the plurality of mobile devices 100 may be a neighborhood-aware network, and one or more of the mobile device clusters 110, 120, 130 may be associated with a particular common mobile device application. For example, each the mobile device clusters 110, 120, 130 may associated with a respective common mobile device application, such as a social networking mobile device application, a gaming mobile device application, or a combination thereof.

In operation, mobile devices of the plurality of mobile devices 100 may communicate wirelessly according to one or more wireless communication protocols. For example, in at least one embodiment, mobile devices of the plurality of mobile devices 100 may send and receive discovery messages, such as a discovery beacon associated with an Institute of Electrical and Electronics Engineers (IEEE) 802.11 protocol. As another example, mobile devices of the plurality of mobile devices 100 may communicate via a network advertisement protocol that is common to each mobile device of the plurality of mobile devices 100. As another example, the first mobile device cluster 110 may communicate using a second cluster protocol that is different than the network advertisement protocol. Similarly, the second mobile device cluster 120 may communicate using a third cluster protocol that is different than the network advertisement protocol, and the third mobile device cluster 130 may communicate using a fourth cluster protocol that is different than the network advertisement protocol. In this context, a protocol refers to parameters used to communicate, such as a channel on which communications occur, timing of communications (e.g., timing of discovery intervals), etc.

To further illustrate, the mobile device 142 may receive a first discovery message via the network advertisement protocol common to the plurality of mobile devices 100. For example, the mobile device 142 may receive the first discovery message from the mobile device 122. The first discovery message may include information specific to the second mobile device cluster 120. For example, the information may indicate (e.g., advertise) the second mobile device cluster 120, such as by indicating characteristics of the protocol associated with the second mobile device cluster 120. The information may include an indication of a second wireless channel associated with the second mobile device cluster 120 that is different than a first wireless channel associated with the network advertisement protocol. Alternatively or in addition, the information may include an indication of a second timing parameter (e.g., a start time and/or a duration of a discovery interval) associated with the second mobile device cluster 120 that is different than a first timing parameter associated with the network advertisement protocol. Alternatively or in addition, the information may include a network size associated with the second mobile device cluster 120 (e.g., to enable mobile devices to determine whether to join the second mobile device cluster 120, for example based on whether an estimated bandwidth associated with the second mobile device cluster 120 is too small based on the network size exceeding a threshold).

In response to receiving the first discovery message, the mobile device 142 may use the information in the first discovery message to communicate with the mobile device 122 using the protocol associated with the second mobile device cluster 120. For example, as explained further below with reference to FIG. 3, the mobile device 142 may join the second mobile device cluster 120, query a mobile device of the second mobile device cluster 120 for additional information (e.g., information related to a mobile device application) associated with the second mobile device cluster 120, or a combination thereof. Communicating with the mobile device 122 may include tuning a transceiver of the mobile device 142 from a first channel (associated with the network advertisement protocol) to the second channel (associated with the second mobile device cluster). After tuning to the second channel, the mobile device 142 may receive a second discovery message from the mobile device 122 at a time that is determined by a second timing parameter that is associated with the second mobile device cluster 120.

In another particular example, the mobile device 132 may send a second discovery message via the network advertisement protocol common to the plurality of mobile devices 100. The second discovery message may include information specific to the third mobile device cluster 130. One or more other devices may receive the second discovery message. For example, the mobile device 128 may receive the second discovery message sent by the mobile device 132. The mobile device 132 may receive a message from the mobile device 128 that is sent based on the information specific to the third mobile device cluster 130. The message may be sent using the protocol associated with the third mobile device cluster 130. The message sent from the mobile device 128 may be a request to join the third mobile device cluster 130, a query for additional information related to the third mobile device cluster 130, or a combination thereof.

In a particular embodiment, each of the mobile device clusters 110, 120 and 130 may be advertised during a discovery interval associated with the network advertisement protocol common to the plurality of mobile devices 100. For example, during a first discovery interval associated with the network advertisement protocol common to the plurality of mobile devices 100, a particular device of the first mobile device cluster 110 (such as the mobile device 114) may send a discovery message advertising the first mobile device cluster 110. Additionally, during the first discovery interval, a particular device of the second mobile device cluster 120 (such as the mobile device 126) may send a discovery message advertising the second mobile device cluster 120. Further, during the first discovery interval, a particular device of the third mobile device cluster 130 (such as the mobile device 136) may send a discovery message advertising the third mobile device cluster 130. Thus, during the first discovery interval, the mobile device 142 may receive discovery messages associated with each of the mobile device clusters via the network advertisement protocol common to the plurality of mobile devices 100 (e.g., by tuning to a channel associated with the network advertisement protocol common to the plurality of mobile devices 100). Accordingly, the mobile device 142 does not have to scan a variety of channels (such as channels associated with each of the mobile device clusters 110, 120, 130), to identify mobile device clusters that are active in a particular area.

It will be appreciated that utilizing the network advertisement protocol common to the plurality of mobile devices 100 may enable transmission and reception of information related to particular clusters of mobile devices (e.g., any of the mobile device clusters 110, 120, 130). Further, by communicating according to cluster specific protocols that are different from the network advertisement protocol, each of the mobile device clusters 110, 120, 130 may tailor communications according to cluster-specific characteristics, such as one or more particular mobile device applications associated with the particular mobile device cluster.

Figure 2:
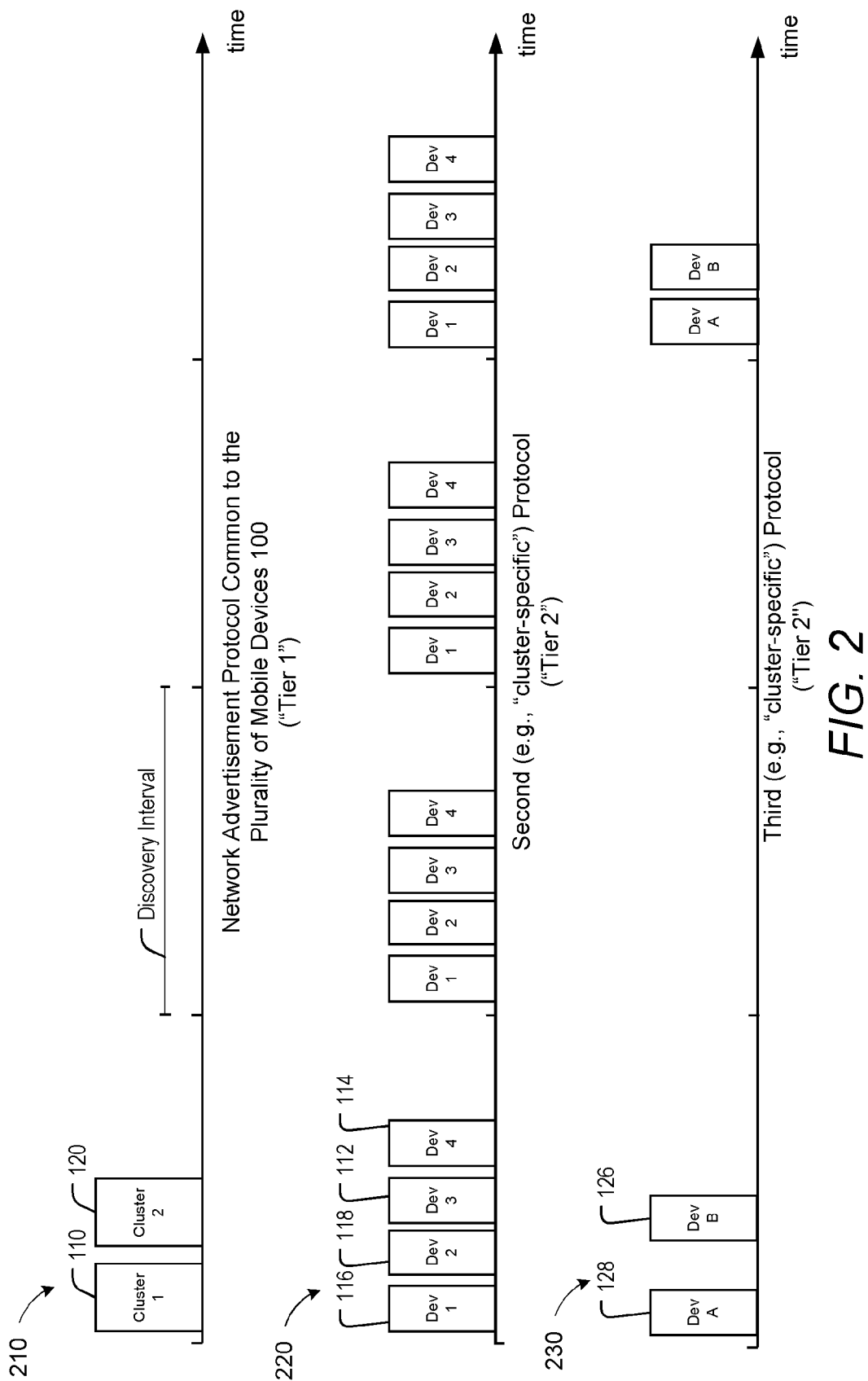
FIG. 2 is a diagram of a plurality of timing diagrams illustrating example operations of the plurality of mobile devices of FIG. 1.

Referring to FIG. 2, a plurality of timelines illustrating various example operations of the plurality of mobile devices 100 of FIG. 1 is illustrated and generally designated 200. The plurality of timelines 200 includes a first timeline 210, a second timeline 220, and a third timeline 230.

The first timeline 210 illustrates example discovery intervals associated with communication according to the network advertisement protocol common to the plurality of mobile devices 100. In at least one embodiment, mobile device clusters utilize each discovery interval to contend to send respective discovery messages associated with the mobile device clusters. For example, in the particular example of the first timeline 210, the first mobile device cluster 110 may contend with the second mobile device cluster 120. That is, one or more devices of the first mobile device cluster 110 may attempt to send a first discovery message associated with the first mobile device cluster 110 (e.g., a discovery message) that advertises the first mobile device cluster 110. Similarly, one or more devices of the second mobile device cluster 120 may contend to send a second discovery message (e.g., a second discovery message that advertises) the second mobile device cluster 120. In a particular embodiment, each device of the plurality of mobile devices 100 contends with each other device of the plurality of mobile devices 100 to send a discovery message associated with a cluster of which the device is a member. To illustrate, the mobile device 112 may attempt to send (using a contention process) a discovery message advertising the first mobile device cluster while each other device of the plurality of mobile devices 100 also attempts to send a discovery message (using the contention process).

The mobile devices may contend using a suitable contention technique, such as a carrier sense multiple access (CSMA) technique. In a particular embodiment, each device of the first mobile device cluster 110 may attempt to send the first discovery message during a particular discovery interval. If one of the mobile devices of the first mobile device cluster 110 is successful in sending the first discovery message during the particular discovery interval, other mobile devices of the first mobile device cluster 110 may cease contention for the remainder of the particular discovery interval. As another example, mobile devices of the second mobile device cluster 120 may contend to send the second discovery message. If one of the mobile devices of the second mobile device cluster 120 successfully sends the second discovery message during the particular discovery interval, then other devices of the second mobile device cluster 120 may cease contention for the remainder of the particular discovery interval.

The second timeline 220 illustrates a particular example operation of mobile devices within the first mobile device cluster 110. Devices of the first mobile device cluster 110 (e.g., the mobile devices 112, 114, 116, 118) may communicate with a second or cluster-specific protocol (e.g., using a communication channel that is associated with the first mobile device cluster 110, using particular timing parameters, etc.). The second cluster protocol may facilitate discovery of and communication between particular devices of the first mobile device cluster 110. Accordingly, mobile devices of first mobile device cluster 110 may contend (e.g., using a contention technique, such as a CSMA technique) to send messages (e.g., discovery messages) to other mobile devices of the first mobile device cluster 110. Similarly, the third timeline 230 depicts example communications of the second mobile device cluster 120, such as discovery of and communication between the mobile devices 126, 128.

In at least one embodiment, the example operations described in connection with FIG. 2 illustrate a "two tier" method of communication. For example, the network advertisement protocol common to the plurality of mobile devices 100 may correspond to a first tier of communication. Further, each cluster-specific protocol (e.g., the second cluster protocol and the third cluster protocol) may correspond to a second tier of communication. Mobile devices may alternate communication between the first tier and the second tier in order to advertise one or more mobile device clusters to prospective members and to communicate within the mobile device clusters (e.g., to communicate with existing members of the mobile device clusters), respectively, thus providing communication efficiency within the mobile device clusters. The two tier method of communication may enable new devices (e.g., a device that has recently become activated within an area include mobile device clusters) to quickly identify mobile device clusters that are of interest (e.g., that are associated with an application executing at the new device) and to determine a protocol used by the mobile device clusters of interest.

Figure 3:
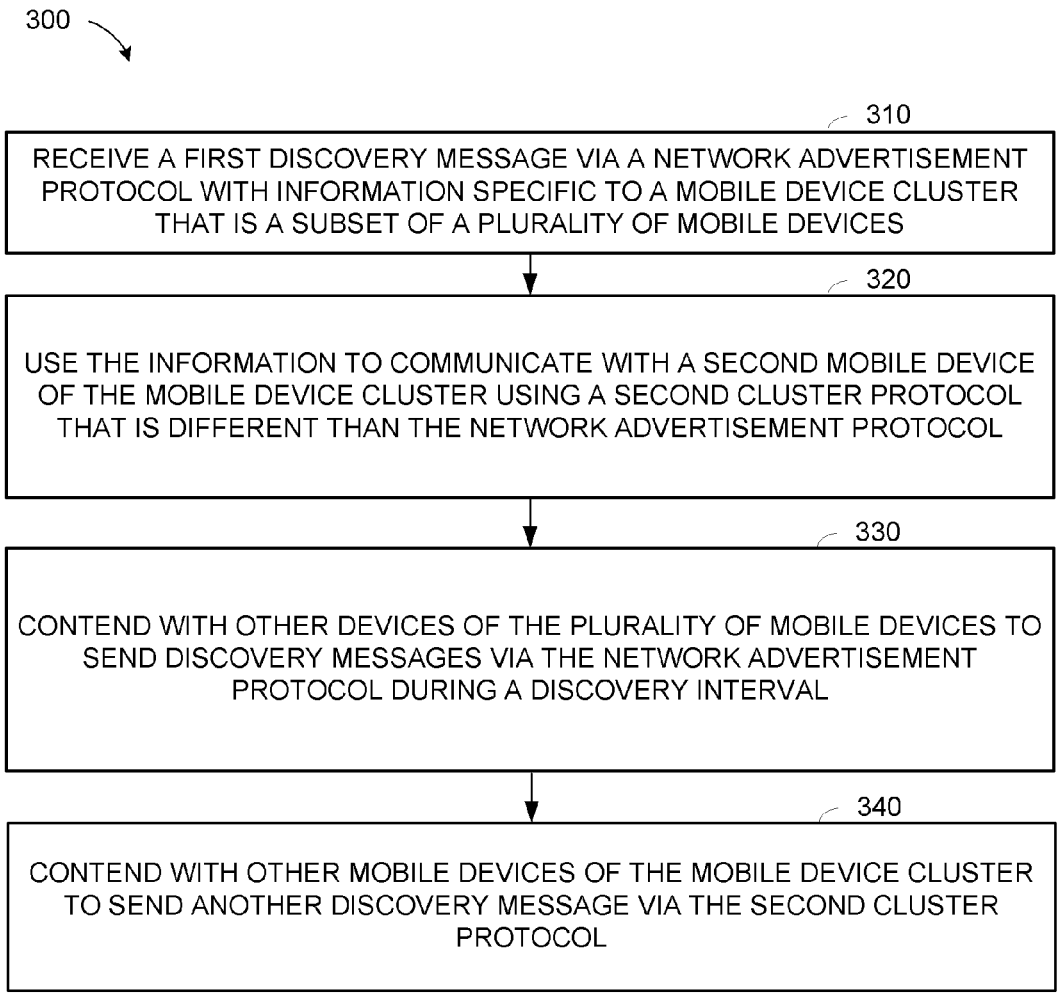
FIG. 3 is a flow chart of a particular illustrative embodiment of a method of operation of one or more of the mobile devices of FIG. 1.

Referring to FIG. 3, a particular illustrative method of operation of one or more of the plurality of mobile devices 100 of FIG. 1 is depicted and generally designated 300. The method 300 includes receiving, by a first mobile device, a first discovery message, at 310. The first discovery message is received via a network advertisement protocol common to the plurality of mobile devices. The first discovery message includes information specific to at least one mobile device cluster (e.g., at least one of the mobile device clusters 110, 120, 130) that is a subset of the plurality of mobile devices.

At 320, the method 300 includes using the information to communicate with at least a second mobile device of the mobile device cluster using a second cluster protocol that is different than the network advertisement protocol. For example, using the information may include querying the second mobile device for additional information associated with the mobile device cluster, joining the mobile device cluster, sending a second discovery message advertising the mobile device cluster via the network advertisement protocol, turning a transceiver of the first mobile device from a first channel to a second channel and receiving a second discovery message from the second mobile device at a time determined by a second timing parameter via the second channel and using the second cluster protocol, or a combination thereof.

At 330, the method 300 further includes contending with other devices of the plurality of mobile devices to send discovery messages via the network advertisement protocol during a discovery interval associated with the network advertisement protocol. In at least one embodiment, contending is performed via a carrier sense multiple access (CSMA) technique. Contending may include awakening from a low-power state at a start time associated with the discovery interval to send a second discovery message and selecting a randomized time within the discovery interval at which to send the second discovery message, where if another discovery message is sent by another device advertising the mobile device cluster prior to the randomized start time, contention is ceased for a remainder of the discovery interval. Otherwise, the second discovery message may be sent at the randomized start time. If another discovery message is sent by another device advertising a second mobile device cluster, contention is continued for a remainder of the discovery interval, or until the second discovery message is sent.

After joining a particular mobile device cluster, the first mobile device may send a discovery message (using a protocol associated with the particular mobile device cluster) advertising the first mobile device to other devices of the particular mobile device cluster. The first mobile device may contend with other devices of the particular mobile device cluster to send the discovery message during a discovery interval associated with the particular mobile device cluster (which may be different from the discovery interval associated with the network advertisement protocol). As an example, the method 300 of FIG. 3 may include contending (e.g., using a CSMA technique) with other mobile devices of the mobile device cluster to send another discovery message, at 340. Contending to send the another discovery message may include awakening from a low-power state at a start time associated with a discovery interval to send the another discovery message, selecting a randomized time within the discovery interval at which to send the another discovery message, and/or contending with other mobile devices of the mobile device cluster to send the another discovery message via the second cluster protocol.

Thus, during a first discovery interval associated with the network advertisement protocol, the first mobile device may send a first discovery message advertising a first mobile device cluster, and during a second discovery interval associated with the first mobile device cluster, the first mobile device may send a second discovery message adverting the first mobile device's presence and participation in the first mobile device cluster. Accordingly, in a particular illustrative embodiment, the method 300 of FIG. 3 illustrates a "two tier" communication method (e.g., for communication within a neighborhood-aware network), whereby a particular mobile device cluster (e.g., an application-specific cluster of mobile devices) is advertised using a network advertisement protocol to prospective members of the mobile device cluster and presence and/or participation in the mobile device cluster is advertised to members of the mobile device cluster via a second (e.g., cluster-specific) protocol.

Figure 4:
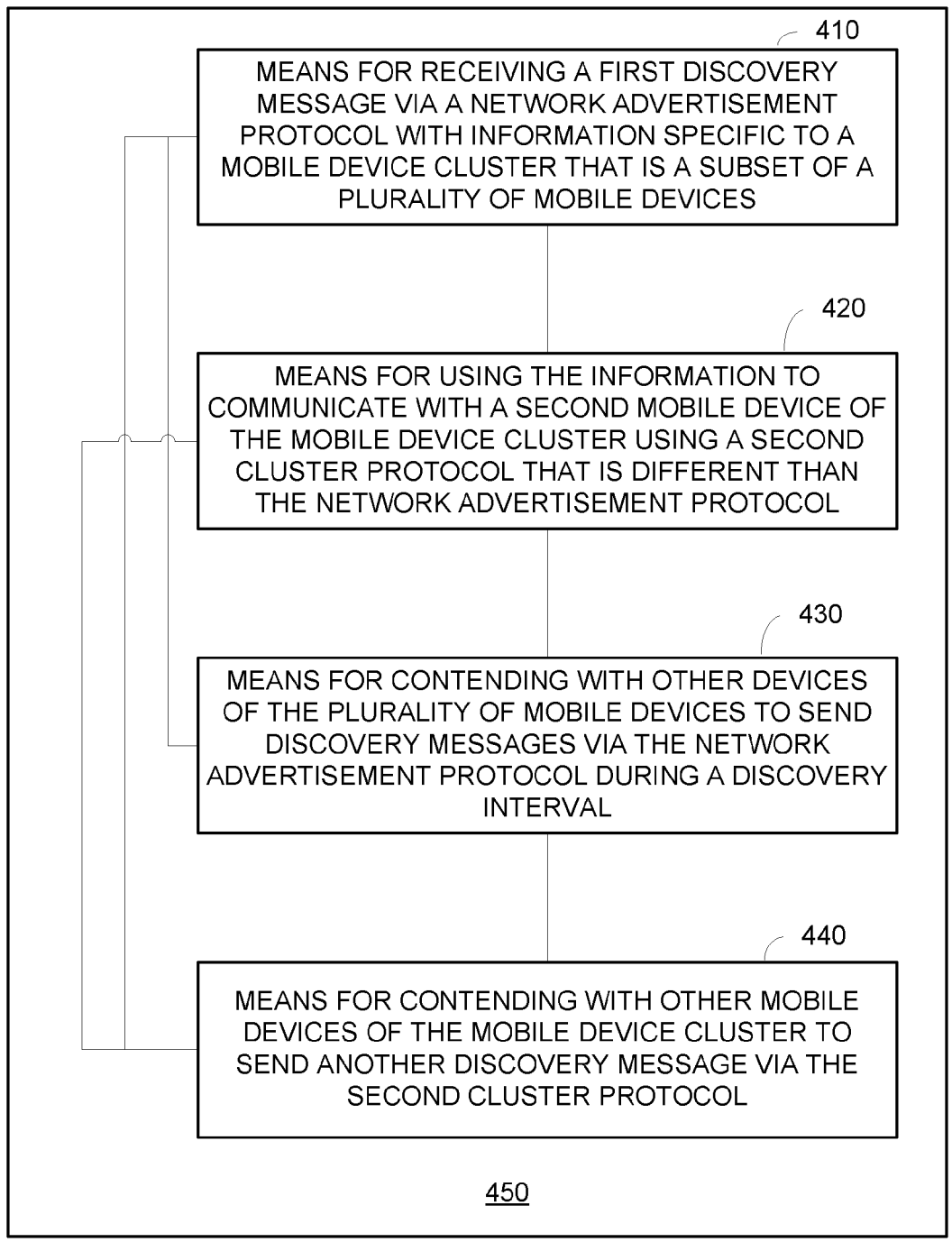
FIG. 4 is a functional block diagram of a particular illustrative embodiment of a mobile device that receives a first discovery message of FIG. 1
Figure 7:
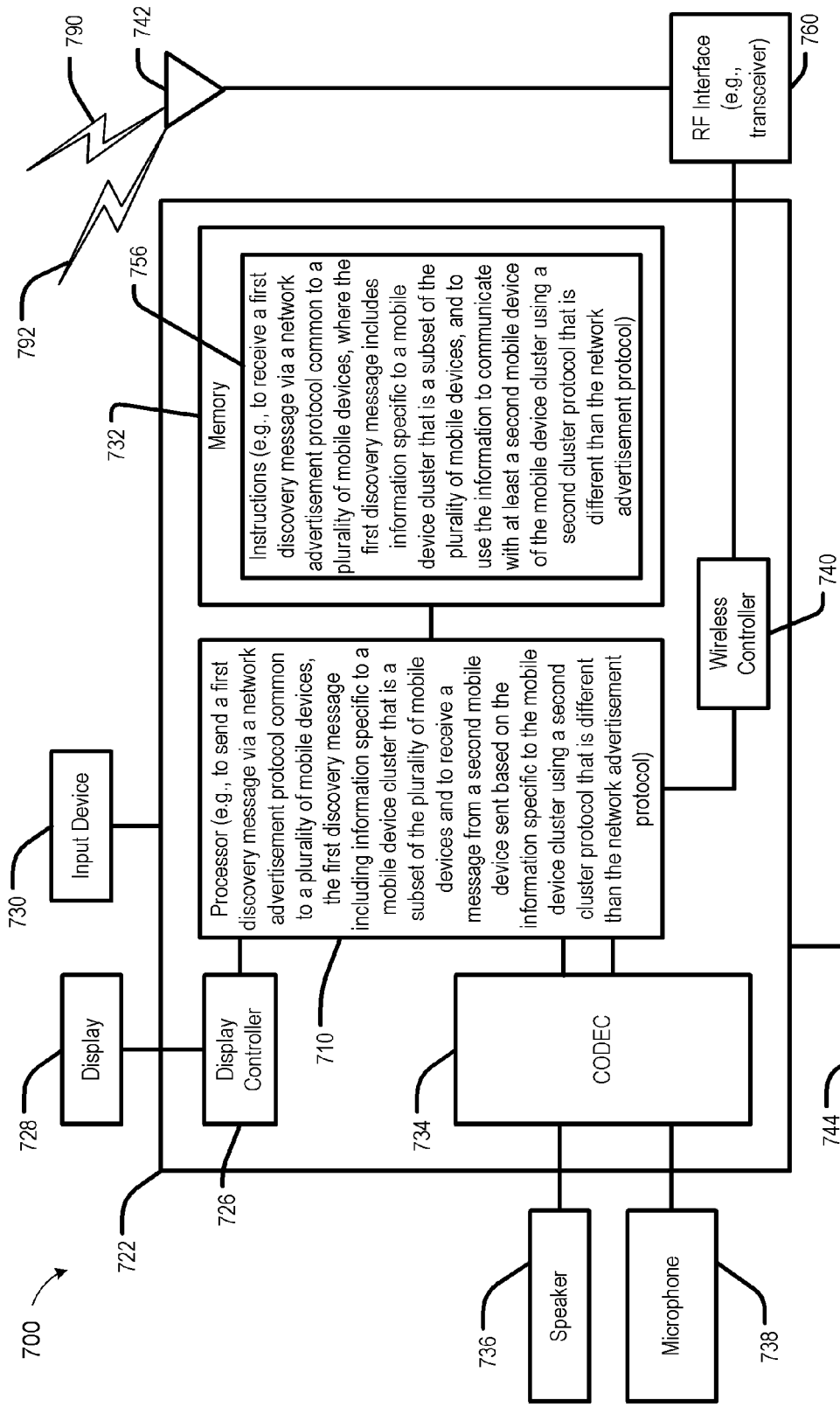
FIG. 7 is a diagram of a particular illustrative embodiment of one or more of the mobile devices of FIG. 1.

Referring to FIG. 4, a functional block diagram of a particular illustrative embodiment of a mobile device that receives a first discovery message of FIG. 1 is illustrated. The device 450 can include means for receiving 410 a first discovery message via a network advertisement protocol with information specific to a mobile device cluster that is a subset of a plurality of mobile devices. In certain embodiments, the means for receiving 410 a first discovery message can be configured to perform one or more of the functions described above with respect to block 310 (FIG. 3). In various embodiments, the means for receiving 410 a first discovery message can be implemented by an RF interface 760 (FIG. 7).

The device 450 further includes means for using 420 the information to communicate with a second mobile device of the mobile device cluster using a second cluster protocol that is different than the network advertisement protocol. In certain embodiments, the means for using 420 the information can be configured to perform one or more of the functions described above with respect to block 320 (FIG. 3). In various embodiments, the means for using 420 the information can be implemented by one or more of a processor 710 or a memory 732 (FIG. 7).

The device 450 further includes means for contending 430 with other devices of the plurality of mobile devices to send discovery messages via the network advertisement protocol during a discovery interval. In certain embodiments, means for contending 430 with other devices of the plurality of mobile devices can be configured to perform one or more of the functions described above with respect to block 330 (FIG. 3). In various embodiments, the means for contending 430 with other devices of the plurality of mobile devices can be implemented by one or more of a processor 710, a memory 732, wireless controller 740 or an RF interface 760 (FIG. 7).

The device 450 further includes means for contending 440 with other mobile devices of the mobile device cluster to send another discovery message via the second cluster protocol. In certain embodiments, means for contending 440 with other mobile devices of the mobile device cluster to send another discovery message can be configured to perform one or more of the functions described above with respect to block 340 (FIG. 3). In various embodiments, the means for contending 440 with other mobile devices of the mobile device cluster to send another discovery message can be implemented by one or more of a processor 710, a memory 732, wireless controller 740 or an RF interface 760 (FIG. 7).

Figure 5:
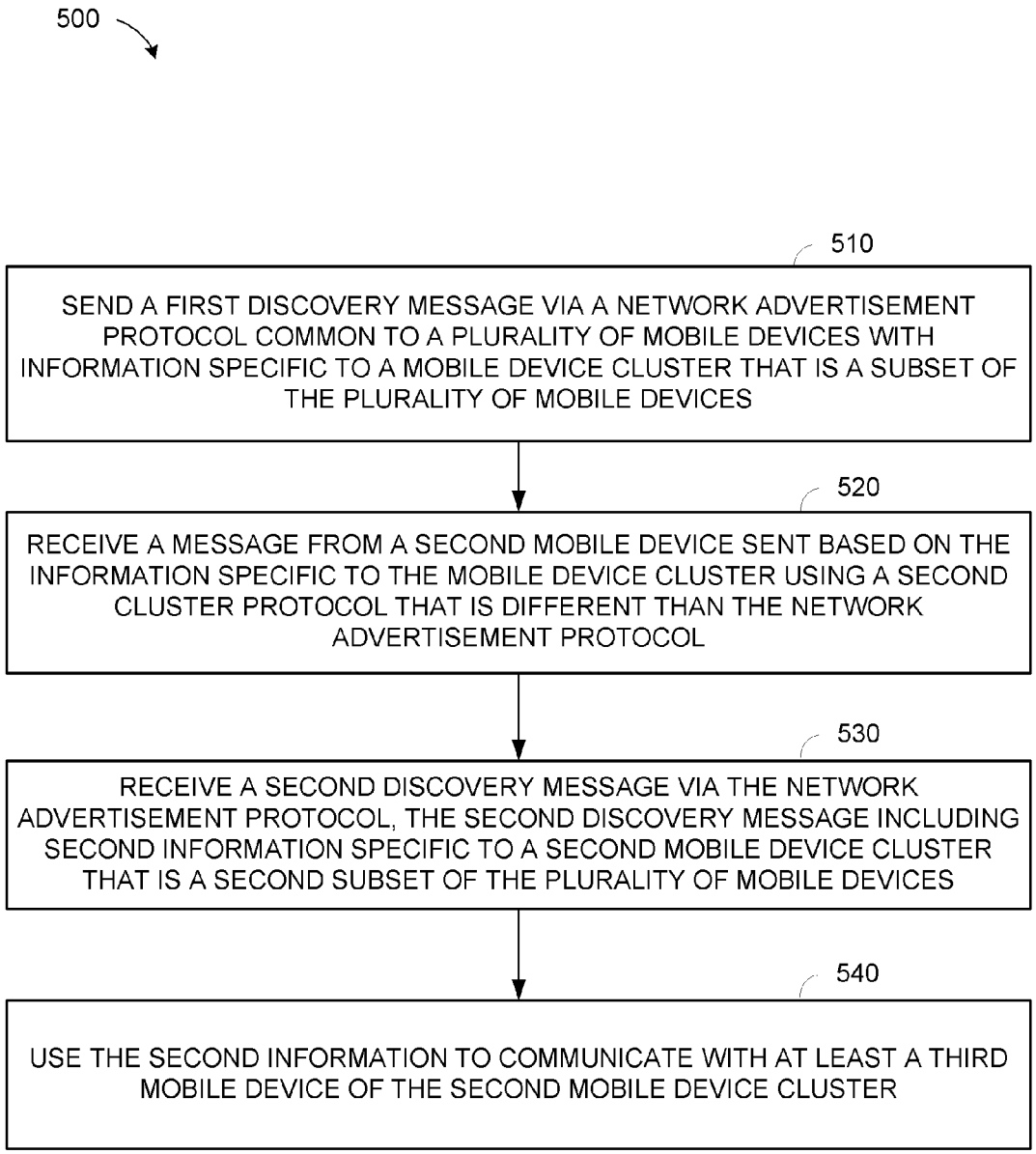
FIG. 5 is a flow chart of a particular illustrative embodiment of a method operation of one or more of the mobile devices of FIG. 1.

Referring to FIG. 5, a particular example method of operation of one or more mobile devices of the plurality of mobile devices 100 of FIG. 1 is depicted and generally designated 500. The method 500 includes sending, by first mobile device, a first discovery message via a network advertisement protocol common to the plurality of mobile devices, at 510. In at least one embodiment, the first discovery message is a discovery beacon associated with a communication protocol, such as an Institute of Electrical and Electronics Engineers (IEEE) 802.11 protocol.

The first discovery message includes information specific to a mobile device cluster that is a subset of the plurality of mobile devices (e.g., any of the mobile device clusters 110, 120, 130 of FIG. 1). For example, the first discovery message may advertise the mobile device cluster. The mobile device cluster may be associated with a common mobile device application, such as a social-networking mobile device application, a gaming mobile device application, or a combination thereof. Alternatively or in addition, the information may indicate a wireless channel associated with the mobile device cluster, a timing parameter associated with the mobile device cluster, a network size of the mobile device cluster, the common application, or a combination thereof. The wireless channel associated with the mobile device cluster and the timing parameter associated with the mobile device cluster may be different than a wireless channel associated with the network advertisement protocol and a timing parameter associated with the network advertisement protocol.

At 520, a message is received from a second mobile device. The message is sent based on the information specific to the mobile device cluster and using a second cluster protocol that is different than the network advertisement protocol. For example, the message may be sent according to the wireless channel and the timing parameter indicated by the first discovery message.

At 530, a second discovery message is received via the network advertisement protocol. The second discovery message includes second information specific to a second mobile device cluster that is a second subset of the plurality of mobile devices. For example, the mobile device cluster may be any of the mobile device clusters 110, 120, 130, and the second mobile device cluster may be another of the mobile device clusters 110, 120, 130.

At 540, the second information is used to communicate with at least a third mobile device of the second mobile device cluster. For example, in at least one embodiment, the first mobile device uses the second information to join the second mobile device cluster.

One or both of the methods 300 and 500 of FIGS. 3 and 5 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or both of the methods 300 and 400 can be performed by a processor that executes instructions, as described further with respect to FIG. 7.

Figure 6:
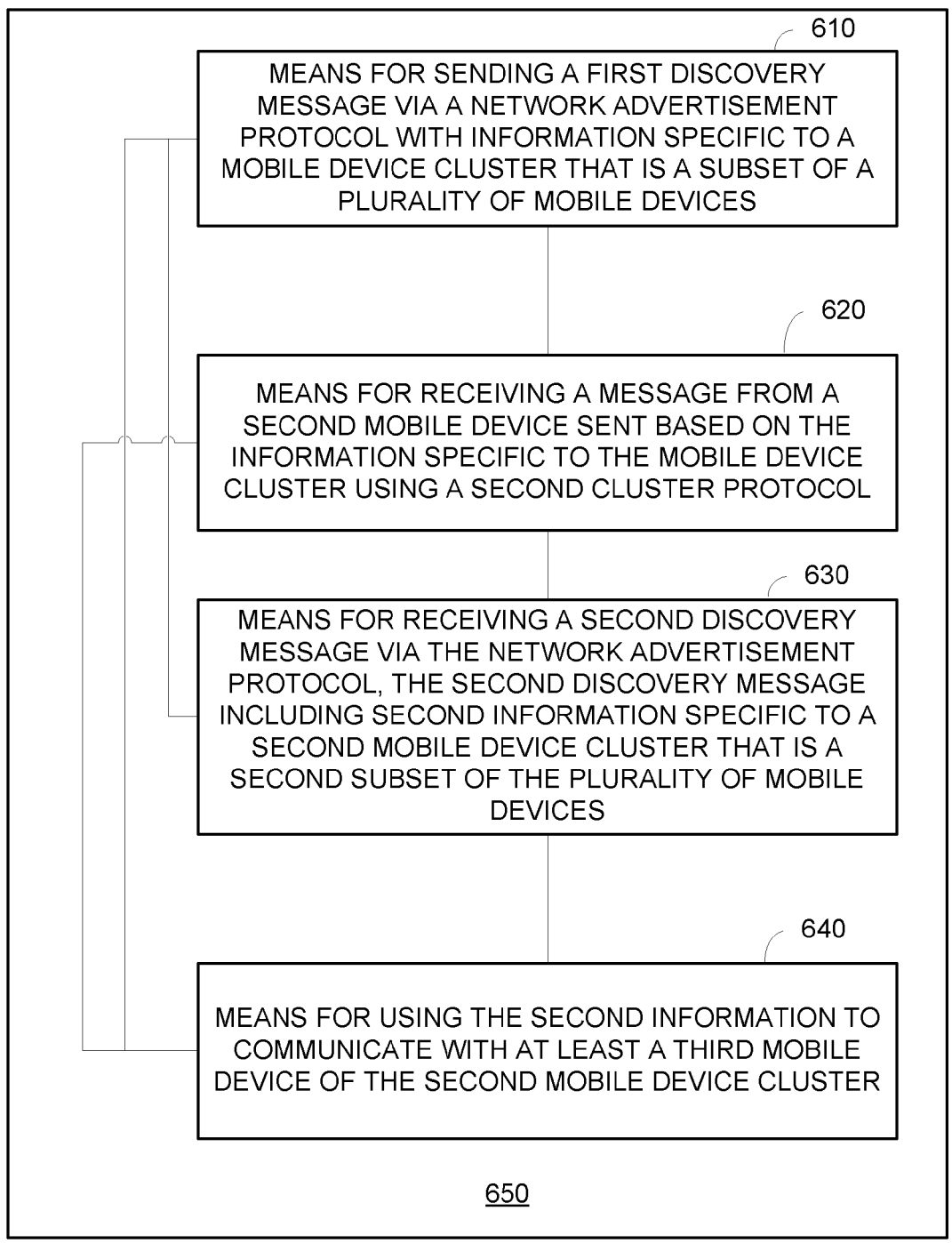
FIG. 6 is a functional block diagram of a particular illustrative embodiment of a mobile device that sends a first discovery message of FIG. 1

Referring to FIG. 6, a functional block diagram of a particular illustrative embodiment of a mobile device that sends a first discovery message of FIG. 1 is illustrated. The device 650 can include means for sending 610 a first discovery message via a network advertisement protocol with information specific to a mobile device cluster that is a subset of a plurality of mobile devices. In certain embodiments, the means for sending 610 a first discovery message can be configured to perform one or more of the functions described above with respect to block 510 (FIG. 5). In various embodiments, the means for sending 610 a first discovery message can be implemented by an RF interface 760 (FIG. 7).

The device 650 further includes means for receiving 620 a message from a second mobile device sent based on the information specific to the mobile device cluster using a second cluster protocol. In certain embodiments, the means for receiving 620 a message from a second mobile device can be configured to perform one or more of the functions described above with respect to block 520 (FIG. 5). In various embodiments, the means for receiving 620 a message from a second mobile device can be implemented by an RF interface 760 (FIG. 7).

The device 650 further includes means for receiving 630 a second discovery message via the network advertisement protocol, the second discovery message including second information specific to a second mobile device cluster that is a second subset of the plurality of mobile devices. In certain embodiments, the means for receiving 630 a second discovery message can be configured to perform one or more of the functions described above with respect to block 530 (FIG. 5). In various embodiments, the means for receiving 630 a second discovery message can be implemented by an RF interface 760 (FIG. 7).

The device 650 further includes means for using 640 the second information to communicate with at least a third mobile device of the second mobile device cluster. In certain embodiments, the means for using 640 the second information to communicate with at least a third mobile device can be configured to perform one or more of the functions described above with respect to block 540 (FIG. 5). In various embodiments, the means for using 640 the second information to communicate with at least a third mobile device can be implemented by one or more of a processor 710, a memory 732, wireless controller 740 or an RF interface 760 (FIG. 7).

Referring to FIG. 7, a particular illustrative embodiment of one or more of the mobile devices of the plurality of mobile devices 100 of FIG. 1 is depicted and generally designated 700. In the particular embodiment of FIG. 7, the mobile device 700 includes a processor 710 coupled to at least one non-transitory computer readable medium, such as a memory 732. In at least one embodiment, the memory 732 stores instructions 756 to receive a first discovery message 790 via a network advertisement protocol common to a plurality of mobile devices. The first discovery message 790 includes information specific to a mobile device cluster (e.g., one of the mobile device clusters 110, 120, 130) that is a subset of the plurality of mobile devices 100. The mobile device 700 may use the information to communicate with at least a second mobile device of the mobile device cluster using a second cluster protocol that is different than the network advertisement protocol.

The processor 710 may include logic configured to, or may execute instructions to, send a second discovery message 792 via the network advertisement protocol common to the plurality of mobile devices 100. The second discovery message 792 includes information specific to a mobile device cluster (e.g., one of the mobile device clusters 110, 120, 130) that is a subset of the plurality of mobile devices 100. The processor 710 may include logic configured to, or may execute instructions to, receive a message from a second mobile device sent based on the information using a second cluster protocol that is different from the network advertisement protocol.

The memory 732 may store additional instructions, data, or a combination thereof. For example, the memory 732 may store an application associated with a mobile device cluster, such as one or more of the mobile device clusters 110, 120, 130, such as a mobile device gaming application, a mobile device social networking application, or a combination thereof. The application may be stored by each mobile device of the mobile device cluster. Further, each mobile device of the plurality of mobile devices 100 may store at a memory (e.g., at the memory 732) information related to the network advertisement protocol (e.g., an identification of a wireless channel associated with the network advertisement protocol, an identification of one or more timing parameters associated with the network advertisement protocol, such as a duration and/or start time of a discovery interval associated with the network advertisement protocol, a network size associated with the plurality of devices 100, or a combination thereof). Further, each mobile device of each particular mobile device cluster may store at a memory (e.g., at the memory 732) information related to a protocol associated with the particular mobile device cluster (e.g., an identification of a wireless channel associated with the particular mobile device cluster, an identification of one or more timing parameters associated with the particular mobile device cluster, such as a duration and/or start time of a discovery interval associated with the particular mobile device cluster, a network size associated with the particular mobile device cluster, or a combination thereof).

FIG. 7 also shows a display controller 726 that is coupled to the digital signal processor 710 and to a display 728. A coder/decoder (CODEC) 734 can also be coupled to the digital signal processor 710. A speaker 736 and a microphone 738 can be coupled to the CODEC 734. FIG. 7 also indicates that a wireless controller 740 can be coupled to the digital signal processor 710, to a radio frequency (RF) interface (e.g., a transceiver) 760, and to a wireless antenna 742.

In a particular embodiment, the DSP 710, the display controller 726, the memory 732, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the RF interface, the wireless antenna 742, and the power supply 744 are external to the system-on-chip device 722. However, each of the display 728, the input device 730, the speaker 736, the microphone 738, the RF interface 760, the wireless antenna 742, and the power supply 744 can be coupled to a component of the system-on-chip device 722, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communication among mobile devices, comprising:
   receiving, by a first mobile device, a first discovery message via a network advertisement protocol common to a plurality of mobile devices, wherein the first discovery message includes information specific to a mobile device cluster that is a subset of the plurality of mobile devices; and
   using the information to communicate with at least a second mobile device of the mobile device cluster using a second cluster protocol that is different than the network advertisement protocol;
   in response to receiving the first discovery message, contending with other devices of the plurality of mobile devices to send discovery messages via the network advertisement protocol during a discovery interval;
   if a mobile device of the mobile device cluster sends a second discovery message associated with the mobile device cluster, ceasing contention for a remainder of the discovery interval; and
   if a mobile device of a second mobile device cluster that is not included in the mobile device cluster sends a third discovery message, continuing contention for a remainder of the discovery interval or until a mobile device of the mobile device cluster sends a discovery message.

2. The method of claim 1, the plurality of mobile devices forming a neighborhood-aware network (NAN).

3. The method of claim 1, the mobile device cluster comprising mobile devices configured to execute a common mobile device application.

4. The method of claim 3, wherein the common mobile device application is a social networking mobile device application, a gaming mobile device application, or a combination thereof.

5. The method of claim 3, wherein the information is selected from the group consisting of information indicating a wireless channel associated with the mobile device cluster, information indicating a timing parameter associated with the mobile device cluster, information indicating a network size of the mobile device cluster or information indicating the common mobile device application.

6. The method of claim 5, wherein communicating with the second mobile device includes querying the second mobile device for additional information associated with the mobile device cluster, joining the mobile device cluster, sending the second discovery message advertising the mobile device cluster via the second cluster protocol, or a combination thereof.

7. The method of claim 6, wherein sending the second discovery message includes contending with other devices of the mobile device cluster to send the second discovery message via the network advertisement protocol.

8. The method of claim 7, wherein contending to send the second discovery message via the second cluster protocol includes:
   at a start time associated with the discovery interval, awakening from a low-power state to send the second discovery message;
   selecting a randomized time within the discovery interval at which to send the second discovery message; and
   contending with the other mobile devices of the mobile device cluster to send the second discovery message via the second cluster protocol.

9. The method of claim 8, wherein contending to send the second discovery message is performed according to a carrier sense multiple access (CSMA) technique.

10. The method of claim 1, wherein contending to send the discovery messages is performed according to a carrier sense multiple access (CSMA) technique.

11. The method of claim 1, wherein the first discovery message is a discovery beacon.

12. The method of claim 1, further comprising:
receiving the second discovery message via the network advertisement protocol, wherein the second discovery message includes second information specific to a second mobile device cluster that is the second subset of the plurality of mobile devices; and
using the second information to communicate with at least a third mobile device of the second mobile device cluster.

13. The method of claim 1, wherein the network advertisement protocol is associated with a first wireless channel that is different than a second wireless channel associated with the second cluster protocol, wherein the network advertisement protocol is associated with a first timing parameter that is different than a second timing parameter associated with the second cluster protocol, and wherein the first discovery message indicates the second wireless channel and the second timing parameter.

14. The method of claim 13, wherein communicating with the second mobile device includes:
in response to receiving the first discovery message, tuning a transceiver of the first mobile device from the first channel to the second channel; and
receiving a second discovery message from the second mobile device at a time determined by the second timing parameter via the second channel and using the second cluster protocol.

15. A mobile device for communication with other mobile devices comprising:
a processor; and
a memory coupled to the processor and storing instructions executable by the processor to:
receive a first discovery message via a network advertisement protocol common to a plurality of mobile devices, wherein the first discovery message includes information specific to a mobile device cluster that is a subset of the plurality of mobile devices; and
use the information to communicate with at least a second mobile device of the mobile device cluster using a second cluster protocol that is different than the network advertisement protocol;
in response to receiving the first discovery message, contend with other devices of the plurality of mobile devices to send discovery messages via the network advertisement protocol during a discovery interval;
if a mobile device of the mobile device cluster sends a second discovery message associated with the mobile device cluster, cease contention for a remainder of the discovery interval; and
if a mobile device of a second mobile device cluster that is not included in the mobile device cluster sends a third discovery message, continue contention for a remainder of the discovery interval or until a mobile device of the mobile device cluster sends a discovery message.

16. The mobile device of claim 15, wherein the plurality of mobile devices form a neighborhood-aware network (NAN).

17. The mobile device of claim 15, wherein the mobile device cluster comprises mobile devices configured to execute a common mobile device application.

18. The mobile device of claim 17, wherein the common mobile device application is a social networking mobile device application, a gaming mobile device application, or a combination thereof.

19. The mobile device of claim 17, wherein the information is selected from the group consisting of information indicating a wireless channel associated with the mobile device cluster, information indicating a timing parameter associated with the mobile device cluster, information indicating a network size of the mobile device cluster or information indicating the common mobile device application.

20. The device mobile of claim 19, wherein communicating with the second mobile device includes querying the second mobile device for additional information associated with the mobile device cluster, joining the mobile device cluster, sending the second discovery message advertising the mobile device cluster via the second cluster protocol, or a combination there.

21. The mobile device of claim 20, wherein sending the second discovery message includes contending with other devices of the mobile device cluster to send the second discovery message via the network advertisement protocol.

22. The mobile device of claim 21, wherein contending to send the second discovery message via the second cluster protocol includes:
at a start time associated with the discovery interval, awakening from a low-power state to send the second discovery message;
selecting a randomized time within the discovery interval at which to send the second discovery message; and
contending with the other mobile devices of the mobile device cluster to send the second discovery message via the second cluster protocol.

23. The mobile device of claim 22, wherein contending to send the second discovery message is performed according to a carrier sense multiple access (CSMA) technique.

24. The mobile device of claim 15, wherein contending to send the discovery messages is performed according to a carrier sense multiple access (CSMA) technique.

25. The mobile device of claim 15, wherein the first discovery message is a discovery beacon.

26. The mobile device of claim 15, further comprising:
receiving the second discovery message via the network advertisement protocol, wherein the second discovery message includes second information specific to a second mobile device cluster that is the second subset of the plurality of mobile devices; and
using the second information to communicate with at least a third mobile device of the second mobile device cluster.

27. The mobile device of claim 15, wherein the network advertisement protocol is associated with a first wireless channel that is different than a second wireless channel associated with the second cluster protocol, wherein the network advertisement protocol is associated with a first timing parameter that is different than a second timing parameter associated with the second cluster protocol, and wherein the first discovery message indicates the second wireless channel and the second timing parameter.

28. The mobile device of claim 27, wherein communicating with the second mobile device includes:
in response to receiving the first discovery message, tuning a transceiver of the first mobile device from the first channel to the second channel; and
receiving a second discovery message from the second mobile device at a time determined by the second timing parameter via the second channel and using the second cluster protocol.

29. A non-transitory computer-readable medium comprising instructions that when executed by a computer causes the computer to perform a method of communication among mobile devices, the method comprising:
receiving, by a first mobile device, a first discovery message via a network advertisement protocol common to a plurality of mobile devices, wherein the first discovery message includes information specific to a mobile device cluster that is a subset of the plurality of mobile devices; and
using the information to communicate with at least a second mobile device of the mobile device cluster using a second cluster protocol that is different than the network advertisement protocol;
in response to receiving the first discovery message, contending with other devices of the plurality of mobile devices to send discovery messages via the network advertisement protocol during a discovery interval;
if a mobile device of the mobile device cluster sends a second discovery message associated with the mobile device cluster, ceasing contention for a remainder of the discovery interval; and
if a mobile device of a second mobile device cluster that is not included in the mobile device cluster sends a third discovery message, continuing contention for a remainder of the discovery interval or until a mobile device of the mobile device cluster sends a discovery message.

30. The non-transitory computer-readable medium of claim 29, wherein the plurality of mobile devices form a neighborhood-aware network (NAN).

31. The non-transitory computer-readable medium of claim 29, wherein the mobile device cluster comprises mobile devices configured to execute a common mobile device application.

32. The non-transitory computer-readable medium of claim 31, wherein the common mobile device application is a social networking mobile device application, a gaming mobile device application, or a combination thereof.

33. The non-transitory computer-readable medium of claim 31, wherein the information is selected from the group consisting of information indicating a wireless channel associated with the mobile device cluster, information indicating a timing parameter associated with the mobile device cluster, information indicating a network size of the mobile device cluster or information indicating the common mobile device application.

34. The non-transitory computer-readable medium of claim 33, wherein communicating with the second mobile device includes querying the second mobile device for additional information associated with the mobile device cluster, joining the mobile device cluster, sending the second discovery message advertising the mobile device cluster via the second cluster protocol, or a combination there.

35. The non-transitory computer-readable medium of claim 34, wherein sending the second discovery message includes contending with other devices of the mobile device cluster to send the second discovery message via the network advertisement protocol.

36. The non-transitory computer-readable medium of claim 35, wherein contending to send the second discovery message via the second cluster protocol includes:
at a start time associated with the discovery interval, awakening from a low-power state to send the second discovery message;
selecting a randomized time within the discovery interval at which to send the second discovery message; and
contending with the other mobile devices of the mobile device cluster to send the second discovery message via the second cluster protocol.

37. The non-transitory computer-readable medium of claim 36, wherein contending to send the second discovery message is performed according to a carrier sense multiple access (CSMA) technique.

38. The non-transitory computer-readable medium of claim 29, wherein contending to send the discovery messages is performed according to a carrier sense multiple access (CSMA) technique.

39. The non-transitory computer-readable medium of claim 29, wherein the first discovery message is a discovery beacon.

40. The non-transitory computer-readable medium of claim 29, further comprising:
receiving the second discovery message via the network advertisement protocol, wherein the second discovery message includes second information specific to a second mobile device cluster that is the second subset of the plurality of mobile devices; and
using the second information to communicate with at least a third mobile device of the second mobile device cluster.

41. The non-transitory computer-readable medium of claim 29, wherein the network advertisement protocol is associated with a first wireless channel that is different than a second wireless channel associated with the second cluster protocol, wherein the network advertisement protocol is associated with a first timing parameter that is different than a second timing parameter associated with the second cluster protocol, and wherein the first discovery message indicates the second wireless channel and the second timing parameter.

42. The non-transitory computer-readable medium of claim 41, wherein communicating with the second mobile device includes:
in response to receiving the first discovery message, tuning a transceiver of the first mobile device from the first channel to the second channel; and
receiving a second discovery message from the second mobile device at a time determined by the second timing parameter via the second channel and using the second cluster protocol.

43. An apparatus for communicating among mobile devices, comprising:
means for receiving a first discovery message via a network advertisement protocol common to a plurality of mobile devices, wherein the first discovery message includes information specific to a mobile device cluster that is a subset of the plurality of mobile devices; and
means for using the information to communicate with at least a second mobile device of the mobile device cluster using a second cluster protocol that is different than the network advertisement protocol;
in response to receiving the first discovery message, means for contending with other devices of the plurality of mobile devices to send discovery messages via the network advertisement protocol during a discovery interval;
if a mobile device of the mobile device cluster sends a second discovery message associated with the mobile device cluster, means for ceasing contention for a remainder of the discovery interval; and
if a mobile device of a second mobile device cluster that is not included in the mobile device cluster sends a third discovery message, means for continuing contention for a remainder of the discovery interval or until a mobile device of the mobile device cluster sends a discovery message.

44. The apparatus of claim 43, wherein the plurality of mobile devices form a neighborhood-aware network (NAN).

45. The apparatus of claim 43, wherein the mobile device cluster comprises mobile devices configured to execute a common mobile device application.

46. The apparatus of claim 45, wherein the common mobile device application is a social networking mobile device application, a gaming mobile device application, or a combination thereof.

47. The apparatus of claim 45, wherein the information is selected from the group consisting of information indicating a wireless channel associated with the mobile device cluster, information indicating a timing parameter associated with the mobile device cluster, information indicating a network size of the mobile device cluster or information indicating the common mobile device application.

48. The apparatus of claim 47, wherein means for using the information to communicate with the second mobile device includes means for querying the second mobile device for additional information associated with the mobile device cluster, means for joining the mobile device cluster, means for sending the second discovery message advertising the mobile device cluster via the second cluster protocol, or a combination there.

49. The apparatus of claim 48, wherein means for sending the second discovery message includes means for contending with other devices of the mobile device cluster to send the second discovery message via the network advertisement protocol.

50. The apparatus of claim 49, wherein means for contending to send the second discovery message via the second cluster protocol includes:
at a start time associated with the discovery interval, awakening from a low-power state to send the second discovery message;
selecting a randomized time within the discovery interval at which to send the second discovery message; and
contending with the other mobile devices of the mobile device cluster to send the second discovery message via the second cluster protocol.

51. The apparatus of claim 50, wherein means for contending to send the second discovery message is performed according to a carrier sense multiple access (CSMA) technique.

52. The apparatus of claim 43, wherein means for contending to send the discovery messages is performed according to a carrier sense multiple access (CSMA) technique.

53. The apparatus of claim 43, wherein the first discovery message is a discovery beacon.

54. The apparatus of claim 43, further comprising:
means for receiving the second discovery message via the network advertisement protocol, wherein the second discovery message includes second information specific to the second mobile device cluster that is a second subset of the plurality of mobile devices; and
means for using the second information to communicate with at least a third mobile device of the second mobile device cluster.

55. The apparatus of claim 43, wherein the network advertisement protocol is associated with a first wireless channel that is different than a second wireless channel associated with the second cluster protocol, wherein the network advertisement protocol is associated with a first timing parameter that is different than a second timing parameter associated with the second cluster protocol, and wherein the first discovery message indicates the second wireless channel and the second timing parameter.

56. The apparatus of claim 55, wherein means for using the information to communicate with the second mobile device includes:
in response to receiving the first discovery message, means for tuning a transceiver of the first mobile device from the first channel to the second channel; and
means for receiving a second discovery message from the second mobile device at a time determined by the second timing parameter via the second channel and using the second cluster protocol.

* * * * *